US010767748B2

United States Patent
Chikugo et al.

(10) Patent No.: US 10,767,748 B2
(45) Date of Patent: *Sep. 8, 2020

(54) MECHANICAL DEVICE, WORKING VEHICLE, AND DETERIORATION STATE ESTIMATION SYSTEM AND DETERIORATION STATE ESTIMATION METHOD OF MACHINE COMPONENT

(71) Applicant: Komatsu Ltd., Tokyo (JP)

(72) Inventors: Hiroyuki Chikugo, Oyama (JP); Shuuji Hori, Oyama (JP); Mutsumi Ono, Oyama (JP); Kiyotaka Saitou, Shimotsuke (JP); Shinya Sano, Oyama (JP); Takeaki Unno, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/508,964

(22) PCT Filed: May 31, 2016

(86) PCT No.: PCT/JP2016/066079
§ 371 (c)(1),
(2) Date: Mar. 6, 2017

(87) PCT Pub. No.: WO2017/208373
PCT Pub. Date: Dec. 7, 2017

(65) Prior Publication Data
US 2018/0156324 A1 Jun. 7, 2018

(51) Int. Cl.
*F16H 57/01* (2012.01)
*F16H 57/04* (2010.01)
(Continued)

(52) U.S. Cl.
CPC ............ *F16H 57/01* (2013.01); *B60K 17/165* (2013.01); *F16H 57/0457* (2013.01);
(Continued)

(58) Field of Classification Search
CPC combination set(s) only.
See application file for complete search history.

(56) References Cited

U.S. PATENT DOCUMENTS 5,064,530 A 11/1991 Duff et al.
8,624,191 B2 1/2014 Franke et al.
(Continued)

FOREIGN PATENT DOCUMENTS

CN 101393108 A 3/2009
CN 101971007 A 2/2011
(Continued)

OTHER PUBLICATIONS

Office Action dated May 11, 2018, issued for the corresponding Canadian Patent Application No. 2,960,323.
(Continued)

*Primary Examiner* — Mulugeta Mengesha
*Assistant Examiner* — Alazar Tilahun
(74) *Attorney, Agent, or Firm* — Locke Lord LLP

(57) ABSTRACT

A mechanical device includes a housing, a transparent spacer member, a magnet, and an image capturing device. The housing has an internal space in which a machine component immersed in oil is housed. The spacer member is disposed in an opening of the housing. The magnet is supported by the spacer member. The image capturing device captures the internal space of the housing via the spacer member.

17 Claims, 14 Drawing Sheets

(51) Int. Cl.
    *B60K 17/16*     (2006.01)
    *H04N 5/225*     (2006.01)
    *G01N 21/95*     (2006.01)
    *G01M 11/08*     (2006.01)
    *G01N 21/85*     (2006.01)
    *G01M 13/02*     (2019.01)
    *F16N 29/00*     (2006.01)
    *H04N 7/18*     (2006.01)
    *G01N 21/94*     (2006.01)

(52) U.S. Cl.
    CPC .......... *F16N 29/00* (2013.01); *G01M 11/081* (2013.01); *G01M 13/02* (2013.01); *G01N 21/85* (2013.01); *G01N 21/9515* (2013.01); *H04N 5/2252* (2013.01); *H04N 7/183* (2013.01); *F16H 2057/012* (2013.01); *F16N 2210/04* (2013.01); *F16N 2260/16* (2013.01); *G01N 21/94* (2013.01); *G01N 2021/8592* (2013.01); *H04N 2005/2255* (2013.01)

(56) References Cited

U.S. PATENT DOCUMENTS

| | | |
|---|---|---|
| 8,881,583 B2 | 11/2014 | Sakaguchi |
| 9,017,198 B2 | 4/2015 | Hoebel et al. |
| 9,294,736 B2 | 3/2016 | Tanuki et al. |
| 9,435,419 B2 | 9/2016 | Hoebel et al. |
| 9,645,392 B2 | 5/2017 | Yoshimura |
| 2003/0095338 A1* | 5/2003 | Singh ............... G02B 13/06 359/725 |
| 2006/0280499 A1* | 12/2006 | Lee ............... H04N 5/2251 396/529 |
| 2008/0041141 A1* | 2/2008 | Discenzo ............... G01L 1/241 73/66 |
| 2010/0208241 A1 | 8/2010 | Franke et al. |
| 2012/0188441 A1* | 7/2012 | Takizawa ............ H04N 5/2251 348/374 |
| 2012/0270692 A1 | 10/2012 | Hoebel et al. |
| 2013/0008242 A1 | 1/2013 | Sakaguchi |
| 2014/0192410 A1 | 7/2014 | Yoshimura |
| 2015/0222858 A1 | 8/2015 | Tanuki et al. |
| 2015/0276036 A1 | 10/2015 | Hoebel et al. |
| 2016/0047461 A1* | 2/2016 | Kelly ............... F16H 57/0483 74/607 |
| 2016/0101734 A1* | 4/2016 | Baek ............... B60R 1/00 348/148 |
| 2016/0356374 A1 | 12/2016 | Hoebel et al. |

FOREIGN PATENT DOCUMENTS

| | | |
|---|---|---|
| CN | 102792016 A | 11/2012 |
| CN | 103828352 A | 5/2014 |
| CN | 103929575 A | 7/2014 |
| CN | 105370862 A | 3/2016 |
| EP | 2988028 A2 | 2/2016 |
| JP | 55-090164 U | 6/1980 |
| JP | 57-121418 U | 7/1982 |
| JP | 58-034042 U | 3/1983 |
| JP | 61-218736 A | 9/1986 |
| JP | 62-34355 U | 2/1987 |
| JP | 64-075945 A | 3/1989 |
| JP | 05-40860 U | 6/1993 |
| JP | 05-64751 U | 8/1993 |
| JP | 10-019788 A | 1/1998 |
| JP | 10-113491 A | 5/1998 |
| JP | 2001-132705 A | 5/2001 |
| JP | 2002-296151 A | 10/2002 |
| JP | 2010-271110 A | 12/2010 |
| JP | 2011-094761 A | 5/2011 |
| JP | 2011-252458 A | 12/2011 |
| JP | 2012-522198 A | 9/2012 |

OTHER PUBLICATIONS

International Search Report and Written Opinion dated Aug. 9, 2016, issued for PCT/JP2016/066079.
Extended European Search Report dated Jan. 23, 2020, issued in the corresponding European Patent Application No. 16838081.4.

* cited by examiner

MECHANICAL DEVICE, WORKING VEHICLE, AND DETERIORATION STATE ESTIMATION SYSTEM AND DETERIORATION STATE ESTIMATION METHOD OF MACHINE COMPONENT

FIELD

The present invention relates to a mechanical device, a working vehicle, a deterioration state estimation system of a machine component, and a deterioration state estimation method of a machine component.

BACKGROUND

A working vehicle driven by a wheel includes an engine, a drive shaft rotated by driving force generated by the engine, and an axle device coupled to the drive shaft. The axle device has an axle housing, a differential, a transmission shaft, and an axle shaft. The differential is housed in an internal space of the axle housing, and is coupled to the drive shaft. Rotating force of the drive shaft is transmitted to the transmission shaft via the differential. Rotating force of the transmission shaft is transmitted to the axle shaft. A machine component of the axle device housed in the internal space of the axle housing is immersed in oil. The wheel of the working vehicle is driven by the rotation of the axle shaft.

The axle device has a sliding portion such as a gear or a bearing. A machine component of the sliding portion is deteriorated due to wear. Therefore, an overhaul of the axle device is performed, and maintenance work of the machine component or replacement work of the machine component is performed.

The overhaul of the axle device is preferable to be performed at appropriate timing. If the overhaul is frequently performed even when the machine component of the axle device is not deteriorated, an operation rate of the working vehicle decreases and cost for the overhaul increases. On the other hand, if the overhaul of the axle device is not performed, progress of wear in the machine component of the axle device or breakage of the component occurs and thus, life of the machine component exhausts before the overhaul is performed. Therefore, it is desirable that the overhaul of the axle device be performed at appropriate timing immediately before the life of the component exhausts while the frequency of the overhaul is suppressed.

Patent Literature 1 discloses a technique for diagnosing a failure of a hydraulic cylinder based on a magnetic body attracted by a magnet.

CITATION LIST

Patent Literature

Patent Literature 1: JP 2001-132705 A

SUMMARY

Technical Problem

In the present circumstances, a technique for detecting signs of progress of wear in a machine component of an axle device or signs of breakage in the machine component has not been established. The establishment of a technique to determine whether the machine component has reached its end of life and overhaul the axle device at appropriate timing immediately before the life of the machine component exhausts is desired. In addition, not only in the axle device, but also in a mechanical device, such as a transmission device, that includes a machine component immersed in oil in an internal space of a housing, the establishment of the technique to determine whether the machine component has reached its end of life and overhaul the mechanical device at appropriate timing immediately before the life of the machine component exhausts is desired.

Aspects of the present invention have an object to provide a mechanical device, a working vehicle, a deterioration state estimation system of a machine component, and a deterioration state estimation method of a machine component that can determine whether a machine component has reached its end of life.

Solution to Problem

According to a first aspect of the present invention, a mechanical device comprises: a housing that has an internal space in which a machine component immersed in oil is housed; a transparent spacer member disposed in an opening of the housing; a magnet supported by the spacer member; and an image capturing device that captures the internal space of the housing via the spacer member.

According to a second aspect of the present invention, a working vehicle comprises the mechanical device according to the first aspect.

According to a third aspect of the present invention, a deterioration state estimation system of a machine component, comprises: a housing that has an internal space in which a machine component immersed in oil is housed; a transparent spacer member disposed in an opening of the housing; a magnet supported by the spacer member; an image capturing device that captures the internal space of the housing via the spacer member; an image data acquisition unit that acquires image data captured by the image capturing device; and an output device that outputs the image data acquired by the image data acquisition unit.

According to a fourth aspect of the present invention, a working vehicle comprises the deterioration state estimation system according to the third aspect.

According to a fourth aspect of the present invention, a deterioration state estimation method of a machine component, comprises: capturing an internal space of a housing, in which a machine component immersed in oil is housed, by an image capturing device via a transparent spacer member that is disposed in an opening of the housing and supports a magnet; and estimating a deterioration state of the machine component based on the image data captured by the image capturing device.

Advantageous Effects of Invention

According to aspects of the present invention, there are provided a mechanical device, a working vehicle, a deterioration state estimation system of a machine component, and a deterioration state estimation method of a machine component that can determine whether a machine component has reached its end of life.

DESCRIPTION OF EMBODIMENTS

In the following, embodiments of the present invention will be described with reference to the drawings. However, the present invention is not limited to these embodiments. The components of the embodiments described below can optionally be combined. Furthermore, there may be a case where some of the components are not used.

First Embodiment

Figure 1:
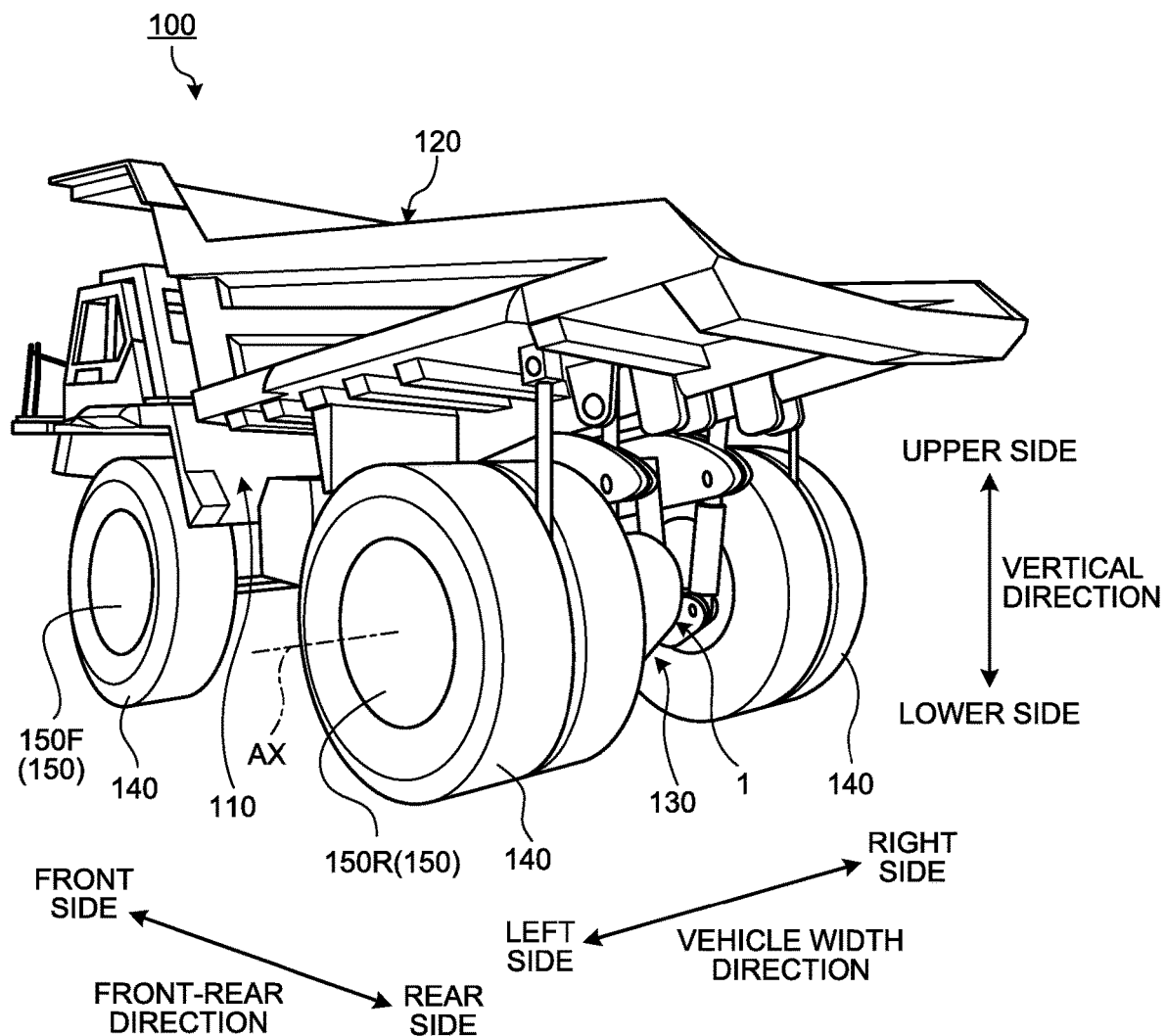
FIG. 1 is a perspective view of an example of a working vehicle according to a first embodiment as viewed from behind.

A first embodiment will be described. FIG. 1 is a perspective view of an example of a working vehicle 100 according to the present embodiment as viewed from behind. In the present embodiment, the working vehicle 100 is a dump truck that travels in a mining site of a mine with a cargo loaded thereon. In the following description, the working vehicle 100 is appropriately referred to as a dump truck 100.

As illustrated in FIG. 1, the dump truck 100 includes a vehicle body frame 110, a dump body 120 supported by the vehicle body frame 110, and a traveling device 130 that travels while supporting the vehicle body frame 110.

The traveling device 130 has a wheel 150 on which a tire 140 is mounted. The wheel 150 includes a front wheel 150F and a rear wheel 150R. The rear wheel 150R rotates about a rotation axis AX.

In the following description, a direction parallel to the rotation axis AX is appropriately referred to as a vehicle width direction. In addition, a traveling direction of the dump truck 100 is appropriately referred to as a front-rear direction. Moreover, a direction orthogonal to the vehicle width direction and to the front-rear direction is appropriately referred to as a vertical direction.

One side in the front-rear direction is a front side, and a direction opposite to the front side is a rear side. One side in the vehicle width direction is a right side, and a direction opposite to the right side is a left side. One side in the vertical direction is an upper side, and a direction opposite to the upper side is a lower side. The front wheel 150F is disposed in front of the rear wheel 150R. The front wheels 150F are disposed at both sides in the vehicle width direction. The rear wheels 150R are disposed at both sides in the vehicle width direction. The dump body 120 is disposed above the vehicle body frame 110.

The vehicle body frame 110 has an engine that serves as a driving source. In the present embodiment, the engine includes an internal combustion engine such as a diesel engine. The dump body 120 is a member on which the cargo is loaded.

The traveling device 130 has an axle device 1 that transmits driving force generated by the engine to the rear wheel 150R. The driving force generated by the engine is transmitted to a drive shaft via a transmission device. The axle device 1 is coupled to the drive shaft. The axle device 1 transmits the driving force of the engine supplied via the transmission device and the drive shaft to the rear wheel 150R. The rear wheel 150R rotates about the rotation axis AX by the supplied driving force. As a result, the traveling device 130 travels.

Figure 2:
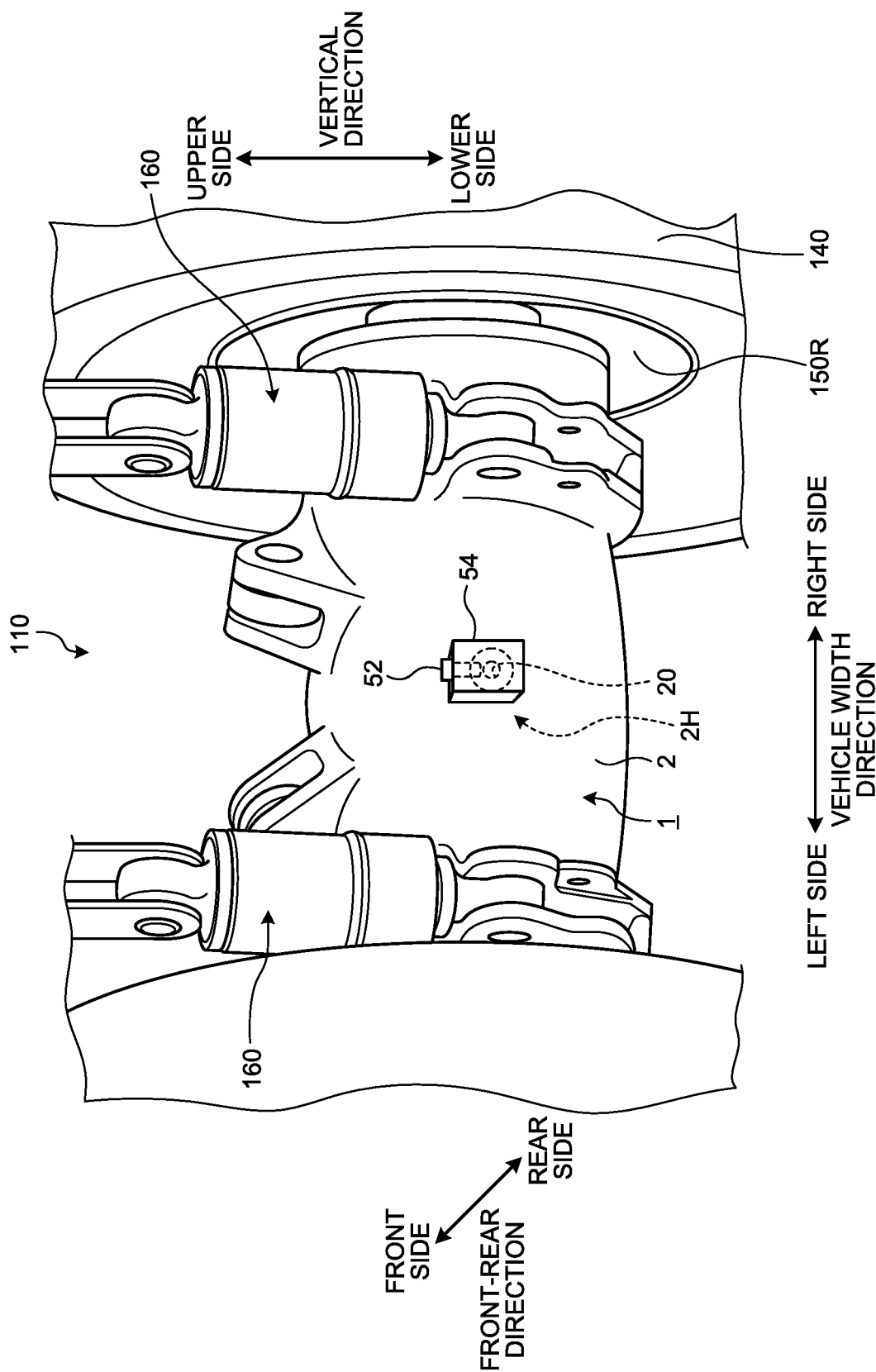
FIG. 2 is a view of a portion of a mechanical device according to the first embodiment as viewed from behind.

FIG. 2 is a view of a portion of the axle device 1 according to the present embodiment as viewed from behind. In the present embodiment, the axle device 1 is a rear axle that drives the rear wheel 150R. The axle device 1 has an axle housing 2. The axle device 1 is a mechanical device in which a machine component is housed in an internal space of the axle housing 2. The axle housing 2 is supported by the vehicle body frame 110 via a suspension device 160. At a rear portion of the axle housing 2, an opening 20 is provided at a center portion in the vehicle width direction. The axle device 1 includes a transparent spacer member 51 and an image capturing device 52. The spacer member 51 is disposed in the opening 20 of the axle housing 2. The image capturing device 52 captures an internal space 2H of the axle housing 2 via the spacer member 51.

Figure 3:
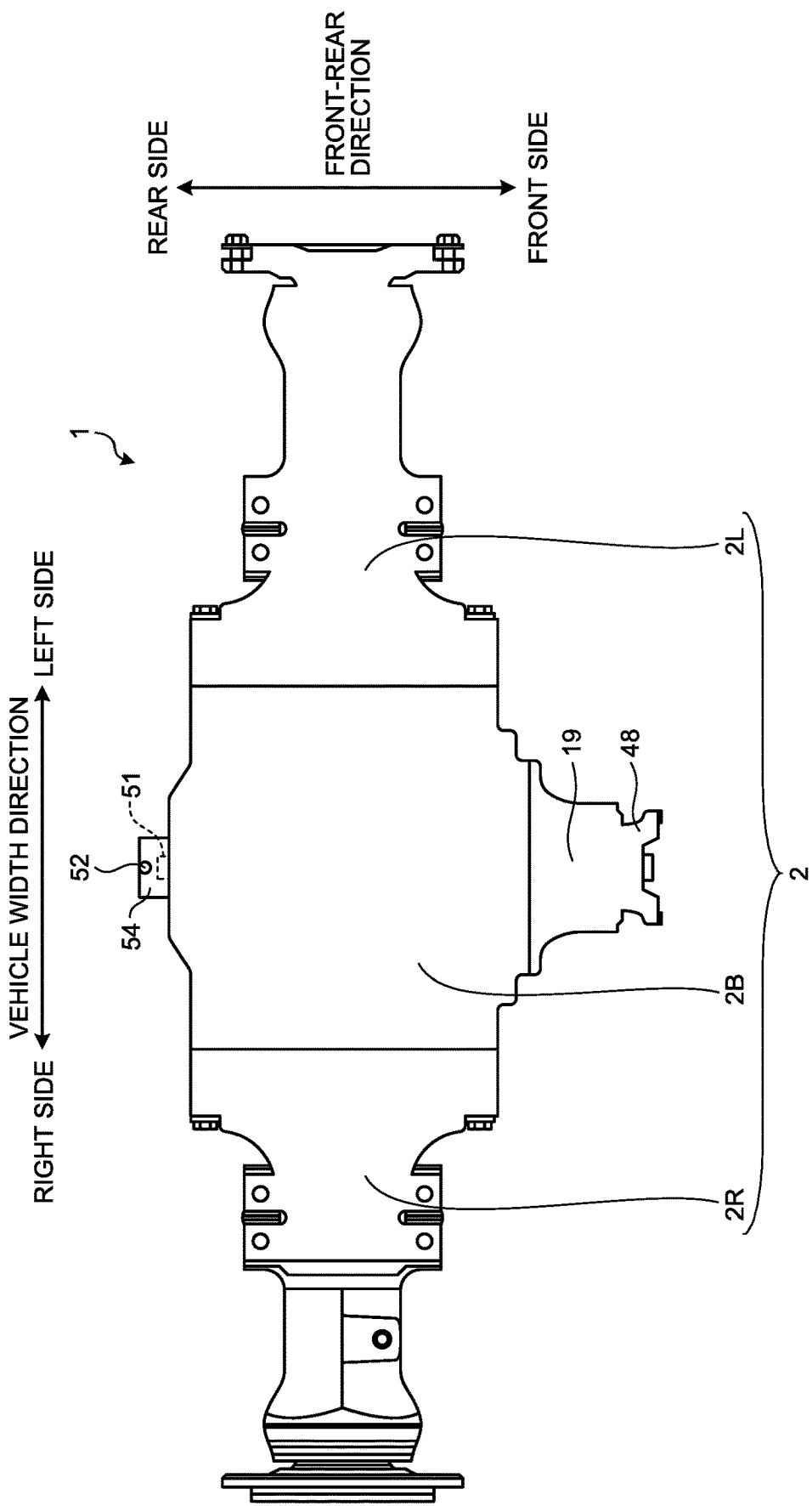
FIG. 3 is a plan view illustrating an example of the mechanical device according to the first embodiment.
Figure 4:
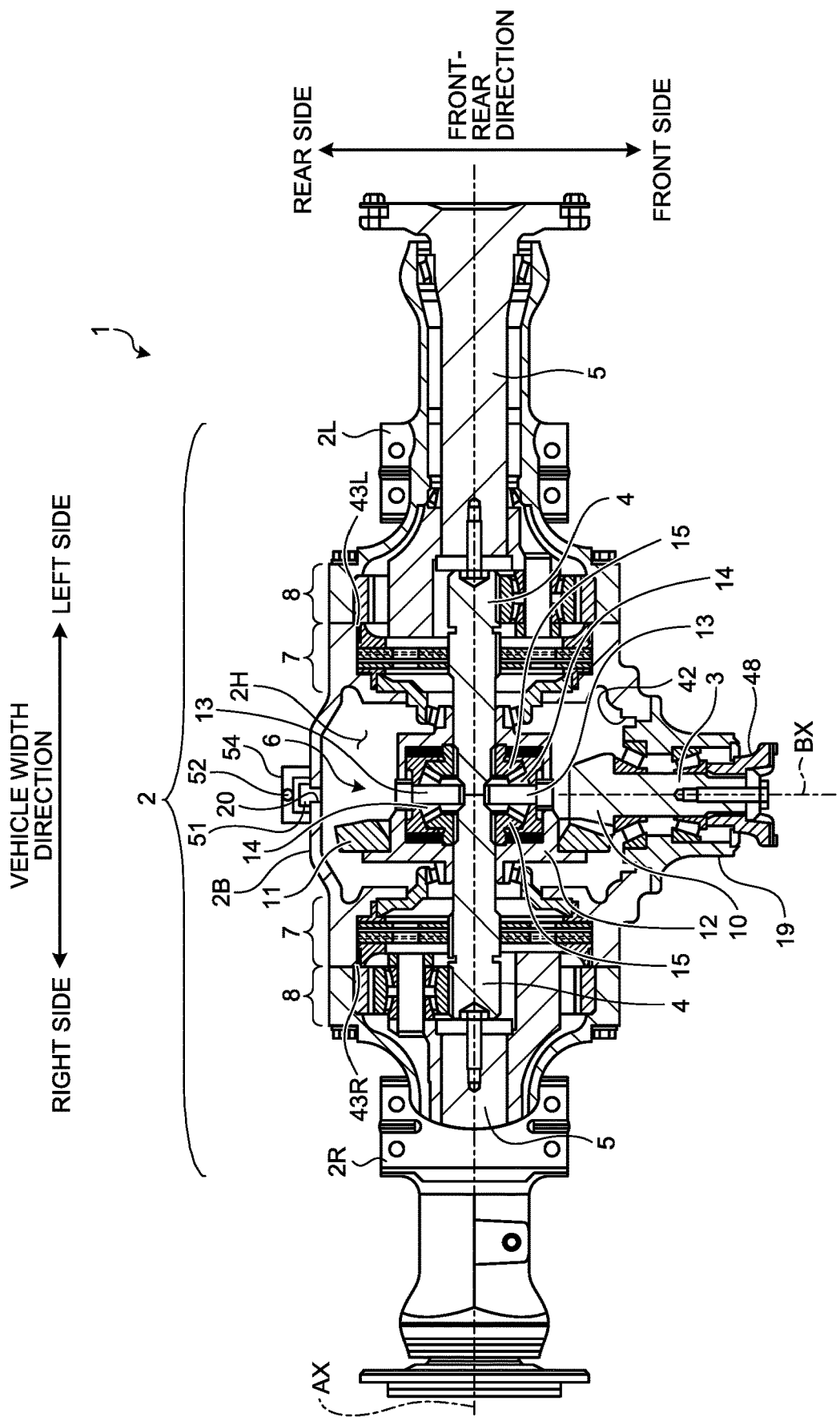
FIG. 4 is a cross-sectional view illustrating an example of the mechanical device according to the first embodiment.

FIG. 3 is a plan view illustrating an example of the axle device 1 according to the embodiment of the present invention. FIG. 4 is a cross-sectional view illustrating an example of the axle device 1 according to the present embodiment.

As illustrated in FIGS. 3 and 4, the axle device 1 has the axle housing 2, a differential 6, a wet multi-plate brake device 7, a planetary gear type speed reducer 8, a transmission shaft 4, and an axle shaft 5. The differential 6 is disposed in the internal space 2H of the axle housing 2, and is coupled to a drive shaft 3. The wet multi-plate brake device 7 and the planetary gear type speed reducer 8 are disposed in the internal space 2H of the axle housing 2. Rotating force of the drive shaft 3 is transmitted to the transmission shaft 4 via the differential 6. Rotating force of the transmission shaft 4 is transmitted to the axle shaft 5. The rear wheel 150R of the dump truck 100 is driven by the rotation of the axle shaft 5.

The axle housing 2 includes a differential body 2B, a right axle housing 2R, and a left axle housing 2L. The differential 6 and the wet multi-plate brake device 7 are housed in the differential body 2B. The planetary gear type speed reducers 8 are each housed in the right axle housing 2R and the left axle housing 2L.

The differential body 2B has a drive shaft opening portion 42 provided at the front side, an axle shaft opening portion 43R provided at the right side, and an axle shaft opening portion 43L provided at the left side. A pinion gauge 19 is disposed in the drive shaft opening portion 42.

The pinion gauge 19 rotatably supports the drive shaft 3. The drive shaft 3 is rotated by the driving force generated by the engine. The drive shaft 3 extends in the front-rear direction, and rotates about a rotation axis BX. The rotation axis BX extends in the front-rear direction.

A coupling 48 is fixed to an end portion of the drive shaft 3. The drive shaft 3 is coupled to a propeller shaft (not illustrated) via the coupling 48. The driving force generated by the engine is transmitted to the propeller shaft via the transmission device. The propeller shaft rotates about the rotation axis BX based on the driving force generated by the engine. The drive shaft 3 coupled to the propeller shaft via the coupling 48 rotates about the rotation axis BX by the rotation of the propeller shaft about the rotation axis BX.

The drive shaft 3 has a drive pinion gear 10. The differential 6 has a bevel gear 11 that meshes with the drive pinion gear 10, and a differential case 12 coupled to the bevel gear 11.

When the drive shaft 3 rotates about the rotation axis BX, the bevel gear 11 rotates about the rotation axis AX. The rotation axis AX extends in the vehicle width direction. The rotation axis AX and the rotation axis BX are substantially orthogonal to each other.

When the bevel gear 11 rotates about the rotation axis AX, the differential case 12 rotates about the rotation axis AX together with the bevel gear 11. A pair of pinion gears 14 and a pair of side gears 15 are provided in the differential case 12. The pinion gears 14 are rotatably supported by the differential case 12 via a spider 13. The side gears 15 mesh with the pinion gears 14.

The side gear 15 is fixed to the transmission shaft 4. The transmission shafts 4 are provided on the right side and the left side. The side gear 15 is splined to the transmission shaft 4. The side gear 15 and the transmission shaft 4 rotate about the rotation axis AX. The wet multi-plate brake device 7 is provided between the transmission shaft 4 and the differential body 2B.

The planetary gear type speed reducer 8 is provided at an outer side of the wet multi-plate brake device 7 in the vehicle width direction. The rotating speed of the transmission shaft 4 is reduced by the planetary gear type speed reducer 8. The rotating force of the transmission shaft 4 is transmitted to the axle shaft 5. The rear wheel 150R connected to the axle shaft 5 rotates about the rotation axis AX by the rotation of the axle shaft 5 about the rotation axis AX.

Accordingly, the rotation axis AX of the bevel gear 11, the rotation axis AX of the transmission shaft 4, and the rotation axis AX of the axle shaft 5 are the same. The bevel gear 11 rotates about the rotation axis AX of the transmission shaft 4.

Figure 5:
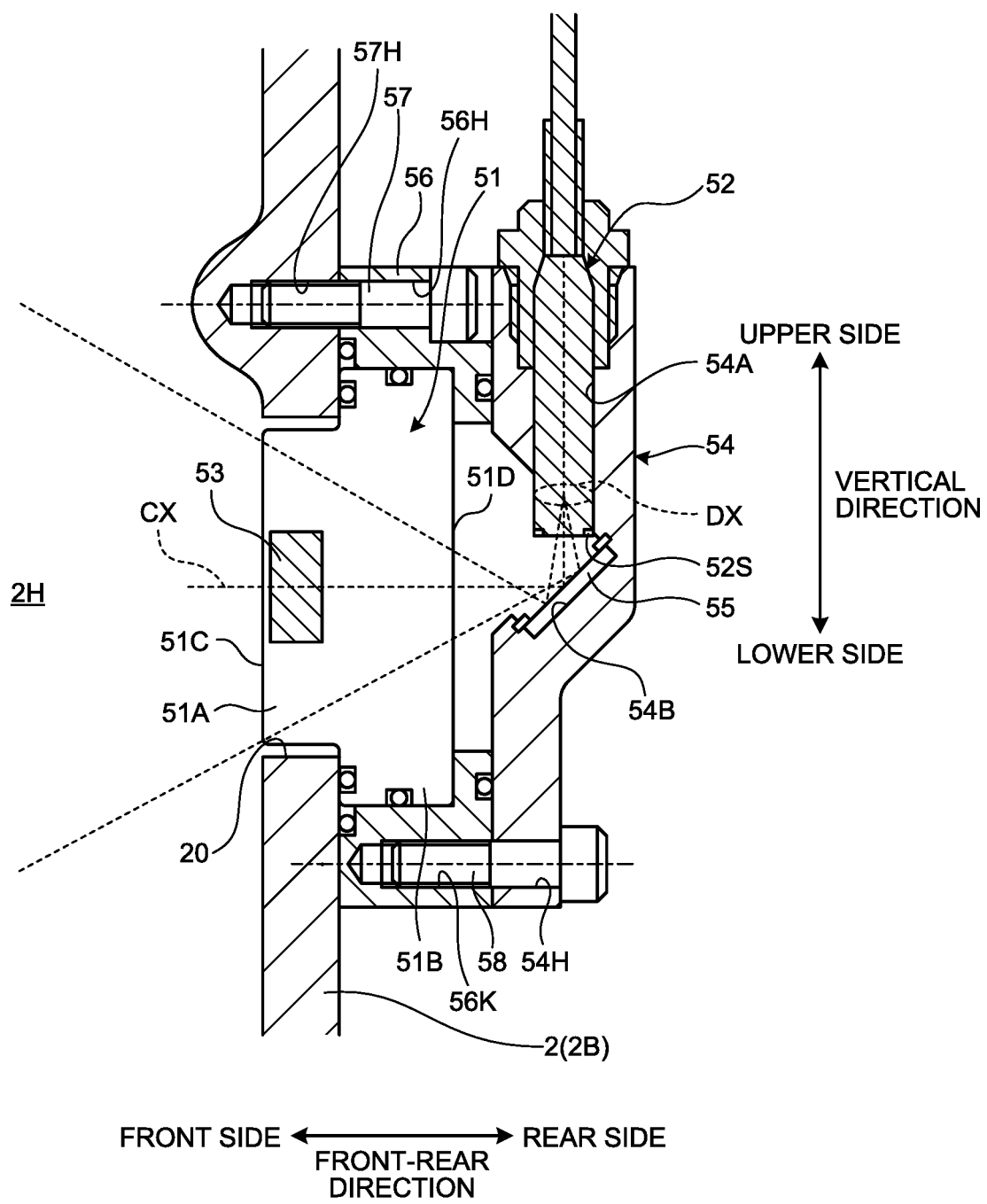
FIG. 5 is a side cross-sectional view illustrating a portion of the mechanical device according to the first embodiment.

FIG. 5 is a side cross-sectional view illustrating a portion of the axle device 1 according to the present embodiment. As illustrated in FIG. 5, the axle device 1 includes the axle housing 2, the transparent spacer member 51, a magnet 53, and the image capturing device 52. The spacer member 51 is disposed in the opening 20 of the axle housing 2. The magnet 53 is supported by the spacer member 51. The image capturing device 52 captures the internal space 2H of the axle housing 2 via the spacer member 51.

In addition, the axle device 1 includes a cover member 54 that supports the image capturing device 52 at an outer side of the axle housing 2 and the spacer member 51.

Moreover, the axle device 1 includes a reflecting mirror 55 supported by the cover member 54. The image capturing device 52 captures the internal space 2H of the axle housing 2 via the reflecting mirror 55.

The opening 20 is provided in the differential body 23 of the axle housing 2. At a rear portion of the differential body 2B, the opening 20 is provided at a center portion in the vehicle width direction.

At least a portion of the spacer member 51 is disposed in the opening 20 of the axle housing 2. In the present embodiment, the spacer member 51 has a projected portion 51A disposed in the opening 20, and a flange portion 51B disposed at an outer side of the axle housing 2. The projected portion 51A has an incident surface 51C that faces the internal space 2H. The incident surface 51O is a flat surface. The incident surface 51C and an inner surface of the axle housing 2, which is disposed to surround the incident surface 51C, are disposed substantially in the same plane (they are flushed). The flange portion 51B has an exit surface 51D that faces a direction opposite to the incident surface 51C. The exit surface 51D is a flat surface. The incident surface 51C and the exit surface 51D are substantially parallel to each other.

The spacer member 51 is substantially a cylindrical member, and has a central axis CX orthogonal to the incident surface 51C and to the exit surface 51D. In the present embodiment, the central axis CX of the spacer member 51 extends in the front-rear direction.

The spacer member 51 is a transparent member that can transmit visible light. In the present embodiment, the spacer member 51 includes a polycarbonate resin. The polycarbonate resin is transparent, and has high heat resistance.

The spacer member 51 is fixed to the axle housing 2 via a fixing member 56. The fixing member 56 is an annular member, and is disposed around the flange portion 51B. The fixing member 56 has a hole 56H in which a bolt 57 is disposed. A hole 57H that has a female screw coupled to a male screw of the bolt 57 is provided in the axle housing 2. The fixing member 56 is fixed to the axle housing 2 by the bolt 57. The flange portion 51B of the spacer member 51 is disposed between the fixing member 56 and an outer surface of the axle housing 2, and is fixed to the axle housing 2 by the fixing member 56.

The image capturing device 52 includes a digital camera that has a lens system, and an imaging element such as a charge coupled device (CCD) image sensor or a complementary metal oxide semiconductor (CMOS) image sensor. The image capturing device 52 can acquire image data of the internal space 2H of the axle housing 2 via the spacer member 51.

The magnet 53 is supported by the spacer member 51. The magnet 53 is a neodymium magnet. In the present embodiment, the magnet 53 is buried in the projected portion 51A of the spacer member 51. In a plane orthogonal to the central axis CX, only one magnet 53 is disposed at a center portion of the projected portion 51A. Note that a plurality of magnets 53 may be provided in the spacer member 51.

The size of an imaging area that can be captured by the image capturing device 52 is larger than an outer shape of the magnet 53. The magnet 53 is disposed in a visual field area of the lens system of the image capturing device 52. The imaging area of the image capturing device 52 includes the visual field area of the lens system of the image capturing device 52. In the present embodiment, the imaging area of the image capturing device 52 is determined so that the whole incident surface 51C is disposed in the imaging area. In addition, the image capturing device 52 has an illumination device 52S that illuminates the imaging area of the image capturing device 52. In the present embodiment, the illumination device 52S includes a light emitting diode (LED) light source. The internal space 2H is illuminated by illumination light emitted from the illumination device 52S. Accordingly, the image capturing device 52 can smoothly acquire the image data of the internal space 2H.

The reflecting mirror 55 is disposed so that a reflecting surface of the reflecting mirror 55 and the exit surface 51D of the spacer member 51 face each other. An optical image of the internal space 2H of the axle housing 2 is projected on the reflecting mirror 55 via the spacer member 51. In the present embodiment, the image capturing device 52 captures the optical image of the internal space 2H of the axle housing 2 projected on the reflecting mirror 55.

The cover member 54 supports the image capturing device 52 and the reflecting mirror 55 at the outer side of the axle housing 2 and the spacer member 51. The cover member 54 has a hole 54A in which the image capturing device 52 is disposed, and a recessed portion 54B in which the reflecting mirror 55 is disposed. In a state of being disposed in the recessed portion 54B, the reflecting mirror 55 faces the exit surface 51D of the spacer member 51 via a gap therebetween. In a state of being disposed in the hole 54A, an incident surface of the lens system of the image capturing device 52 faces the reflecting surface of the reflecting mirror 55 via a gap therebetween.

In the present embodiment, the cover member 54 supports the image capturing device 52 so that an optical axis DX of the lens system of the image capturing device 52 extends in the vertical direction. In the present embodiment, the central axis CX and the optical axis DX are substantially orthogonal to each other.

The cover member 54 is fixed to the fixing member 56. The cover member 54 has a hole 54H in which a bolt 58 is disposed. A hole 56K that has a female screw coupled to a male screw of the bolt 58 is provided in the fixing member 56. The cover member 54 is fixed to the fixing member 56 by the bolt 58. The cover member 54 is fixed to the fixing member 56 which is fixed to the axle housing 2. Accordingly, the cover member 54 is fixed to the axle housing 2 via the fixing member 56.

Figure 6:
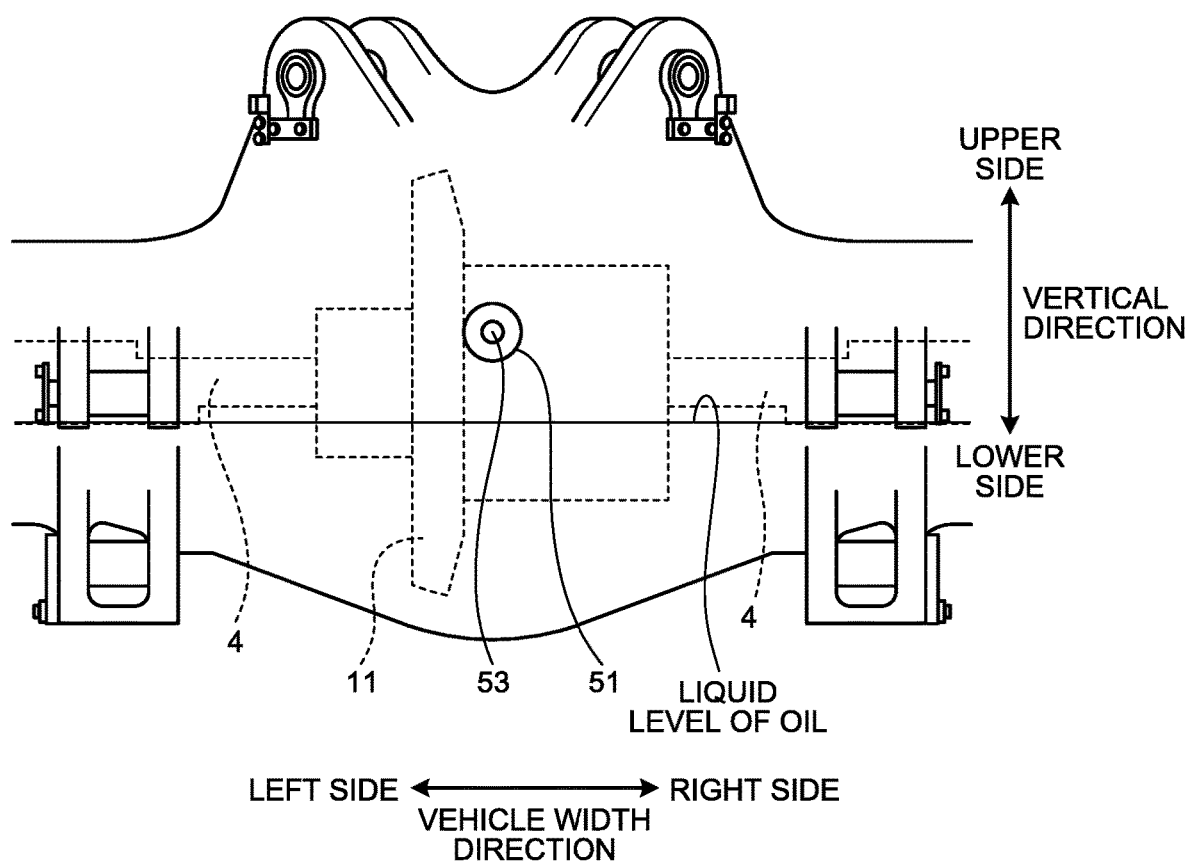
FIG. 6 is a schematic view of a portion of the mechanical device according to the first embodiment as viewed from behind.

FIG. 6 is a schematic view of a portion of the axle device 1 according to the present embodiment as viewed from behind. FIG. 6 is a view for describing a positional relationship between the spacer member 51, the bevel gear 11, and a liquid level of the oil. Therefore, illustration of the other components is simplified or omitted.

As described above, in the internal space 2H of the axle housing 2, a plurality of gears (machine components) such as the drive pinion gear 10, the bevel gear 11, the pinion gear 14, and the side gear 15 are disposed. The oil for lubricating or cooling these gears is housed in the internal space 2H. These gears are immersed in the oil.

In a state where the drive shaft 3 is not rotated and the plurality of gears disposed in the internal space 2H is not operated, the liquid level of the oil stored in the internal space 2H of the axle housing 2 is kept at a predetermined height. In the present embodiment, the opening 20, in which the spacer member 51 is disposed in the state where the gears are not operated, is provided above the liquid level of the oil.

Furthermore, in the present embodiment, the spacer member 51 faces a tooth surface of the bevel gear 11. The tooth surface of the bevel gear 11 includes a surface of a tooth of the bevel gear 11 rubbed against the drive pinion gear 10.

When the bevel gear 11 is operated (rotated) by the rotation of the drive shaft 3, the oil stored in the internal space 2H is scraped up by the bevel gear 11. The oil scraped up by the bevel gear 11 comes in contact with the incident surface 51C of the spacer member 51. On the other hand, when the rotation of the drive shaft 3 is stopped causing the operation (rotation) of the bevel gear 11 to stop, the oil is stored in the internal space 2H so the liquid level of the oil becomes lower than the opening 20 (incident surface 51C).

Among the plurality of gears (the drive pinion gear 10, the bevel gear 11, the pinion gear 14, and the side gear 15) disposed in the internal space 2H of the axle housing 2, the bevel gear 11 has the largest diameter. Therefore, the bevel gear 11, which rotates, can sufficiently scrape up the oil and thus, can sufficiently bring the oil to come in contact with the incident surface 51C.

Figure 7:
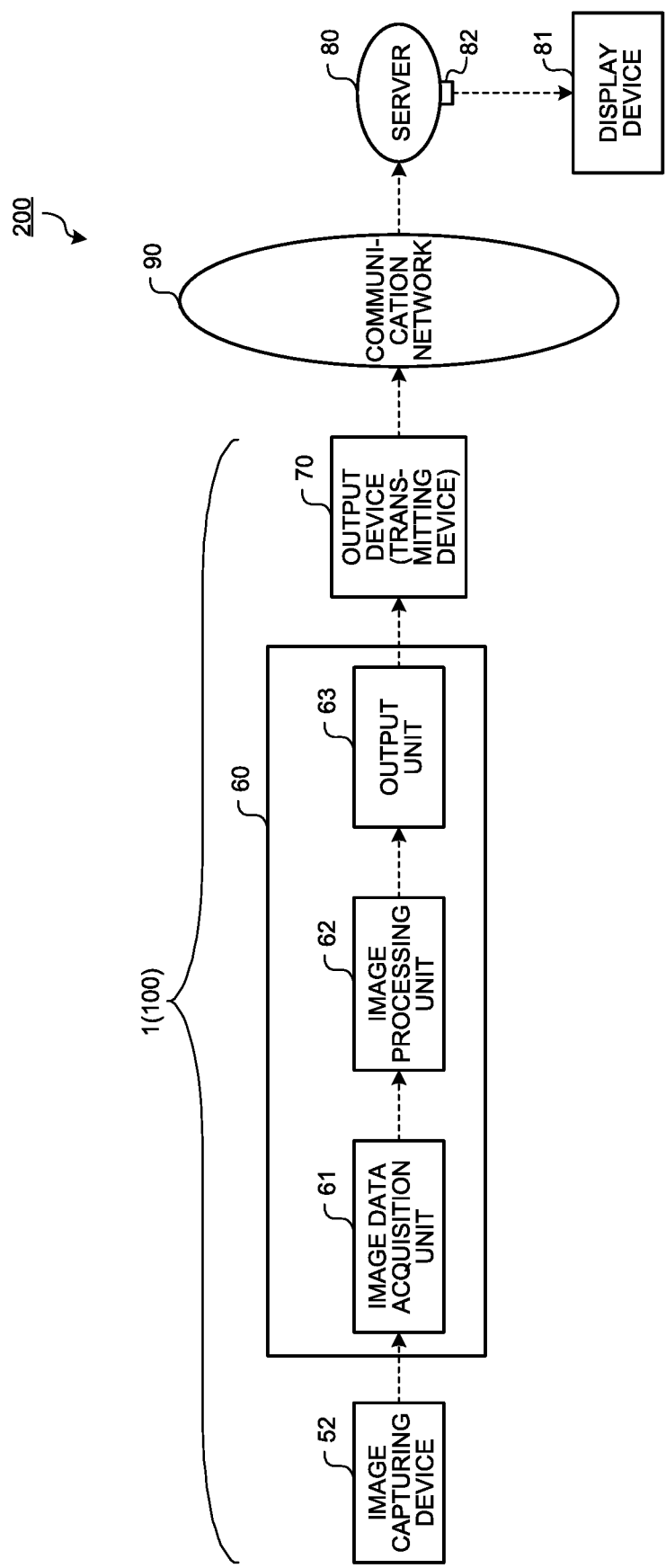
FIG. 7 is a functional block diagram illustrating an example of a deterioration state estimation system including the mechanical device according to the first embodiment.

FIG. 7 is a functional block diagram illustrating an example of a deterioration state estimation system 200 of a machine component including the axle device 1 according to the present embodiment. In the present embodiment, the axle device 1 has a computer system 60 and an output device 70. The computer system 60 and the output device 70 are mounted on the dump truck 100.

The computer system 60 has an image data acquisition unit 61, an image processing unit 62, and an output unit 63. The image data acquisition unit 61 acquires the image data captured by the image capturing device 52. The image processing unit 62 performs image processing of the image data. The output unit 63 outputs the image data in which the image processing has been performed. The image data, which has been acquired in the image data acquisition unit 61 and in which the image processing has been performed in the image processing unit 62, is supplied to the output device 70 via the output unit 63. The output device 70 outputs the image data acquired by the image data acquisition unit 61.

The deterioration state estimation system 200 has a server 80. In the present embodiment, the output device 70 includes a transmitting device that transmits the image data to the server 80. The image data is output from the output device 70 to the server 80. The output device 70 transmits the image data supplied from the output unit 63 to the server 80. In the present embodiment, the output device 70 and the server 80 are connected to each other via a communication network 90. The communication network 90 includes the Internet. Note that the communication network 90 may include a cellular phone communication network. The output device 70 transmits the image data to the server 80 via the communication network 90.

The server 80 receives the image data supplied from each of the plurality of axle devices 1 that exists across the country. The server 80 analyzes the plurality of image data supplied therefrom.

In addition, the server 80 has a display control unit 82 that causes the image data output from the output device 70 to be displayed on a display device 81. The image data captured by the image capturing device 52 is displayed on the display device 81.

Figure 8:
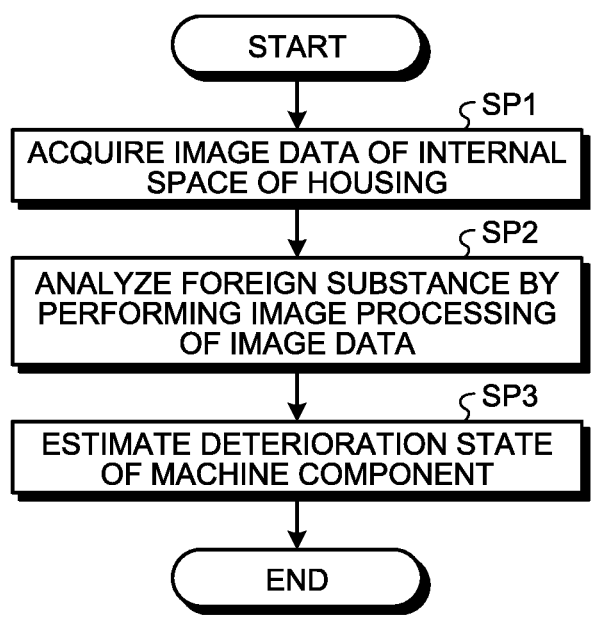
FIG. 8 is a flowchart illustrating an example of a deterioration state estimation method according to the first embodiment.

Next, an example of a method for estimating the deterioration state of the machine component of the axle device 1 will be described using the deterioration state estimation system 200 including the axle device 1 according to the present embodiment. FIG. 8 is a flowchart illustrating an example of the deterioration state estimation method of a machine component according to the present embodiment.

As described above, the axle device 1 has the axle housing 2, and the plurality of gears disposed in the internal space 2H of the axle housing 2. Moreover, a plurality of bearings is also disposed in the internal space 2H of the axle housing 2. In order to lubricate or cool a sliding portion of the gear or the bearing, the oil is stored in the internal space 2H of the axle housing 2. In the internal space 2H, the machine components of the axle device 1 including the gear and the bearing are immersed in the oil.

For example, when the drive pinion gear 10 and the bevel gear 11 are rubbed against each other, there is a possibility that a foreign substance such as wear powder or broken pieces is generated from the drive pinion gear 10 and/or the bevel gear 11. In addition, when the pinion gear 14 and the side gear 15 are rubbed against each other, there is a possibility that a foreign substance such as wear powder or broken pieces is generated from the pinion gear 14 and/or the side gear 15. As described above, in the sliding portion of the axle device 1, there is a possibility that a foreign substance such as wear powder or broken pieces is generated from at least one of two components rubbed against each other.

The foreign substance that has been generated is mixed into the oil. When the foreign substance mixed into the oil enters between the two components rubbed against each other, there is a possibility that such components unevenly wear or break.

In the present embodiment, the magnet 53 is supported by the spacer member 51. The foreign substance is a magnetic body generated from the component of the axle device 1. The foreign substance that has been generated is attracted onto the incident surface 51C of the spacer member 51 by magnetic force of the magnet 53. That is, in the present embodiment, the foreign substance that has been generated from the component of the axle device 1 is collected by the magnetic force of the magnet 53. As described above, in the present embodiment, the spacer member 51 that supports the magnet 53 has a filter function of collecting the foreign substance. The foreign substance generated from the component is prevented from entering between the two components rubbed against each other since the foreign substance mixed into the oil by the magnetic force of the magnet 53 is collected. Accordingly, the uneven wear and breakage of the component of the axle device 1 are suppressed and thus, the deterioration of the component of the axle device 1 is suppressed.

In the present embodiment, when the bevel gear 11 is rotated, the oil is scraped up by the bevel gear 11. The oil scraped up by the bevel gear 11 comes in contact with the incident surface 51C of the spacer member 51. Therefore, in the case where the foreign substance is mixed into the oil, the foreign substance is attracted onto the incident surface 51C of the spacer member 51.

The image capturing device 52 captures the internal space 2H of the axle housing 2. At least a portion of the internal space 2H is defined by the incident surface 51C of the spacer member 51. The image capturing device 52 can capture the foreign substance attracted onto the incident surface 51C.

Figure 9:
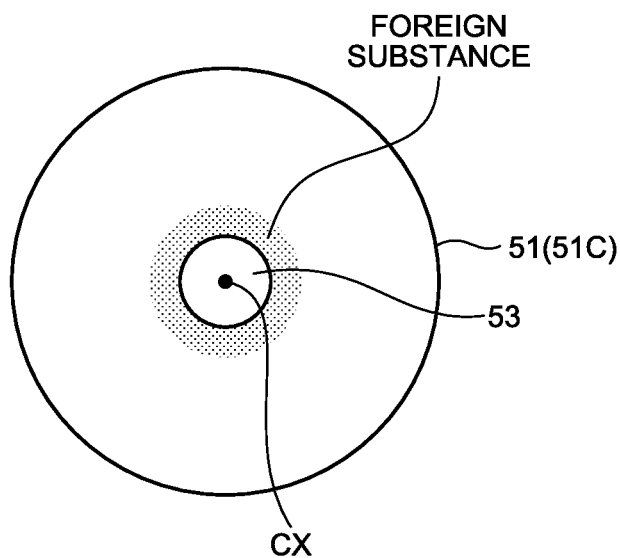
FIG. 9 is a schematic view illustrating an example of image data captured by an image capturing device according to the first embodiment.

FIG. 9 is a schematic view illustrating an example of the image data captured by the image capturing device 52 according to the present embodiment. As illustrated in FIG. 9, the foreign substance mixed into the oil is attracted onto at least the portion of the incident surface 51C by the magnetic force of the magnet 53. The magnet 53 is disposed in the visual field area of the lens system of the image capturing device 52. The imaging area of the image capturing device 52 includes the whole incident surface 51C. The image capturing device 52 captures, via the transparent spacer member 51 disposed in the opening 20 of the housing 2, the internal space 2H of the housing 2 in which the machine component immersed in the oil is housed, and acquires the image data of the internal space 2H of the housing 2 (step SP1). In the case where the foreign substance is attracted onto the incident surface 51C, the image capturing device 52 can capture the foreign substance attracted onto the incident surface 51C via the transparent spacer member 51.

The image data acquired by the image capturing device 52 is supplied to the image data acquisition unit 61 of the computer system 60. The image processing unit 62 performs the image processing of the image data acquired by the image data acquisition unit 61, and analyzes the foreign substance collected on the incident surface 51C (step SP2). The image processing unit 62 performs the image processing of the image data acquired by the image data acquisition unit 61, and calculates the amount of the foreign substance collected on the incident surface 51C. Furthermore, the image processing unit 62 performs the image processing of the image data acquired by the image data acquisition unit 61, and calculates the size of the foreign substance collected on the incident surface 51C.

The image processing unit 62 analyzes the foreign substance based on the image data captured by the image capturing device 52. Based on the result of the analysis, the image processing unit 62 estimates a deterioration state of the machine component housed in the internal space 2H of the housing 2 (step SP3).

Figure 10:
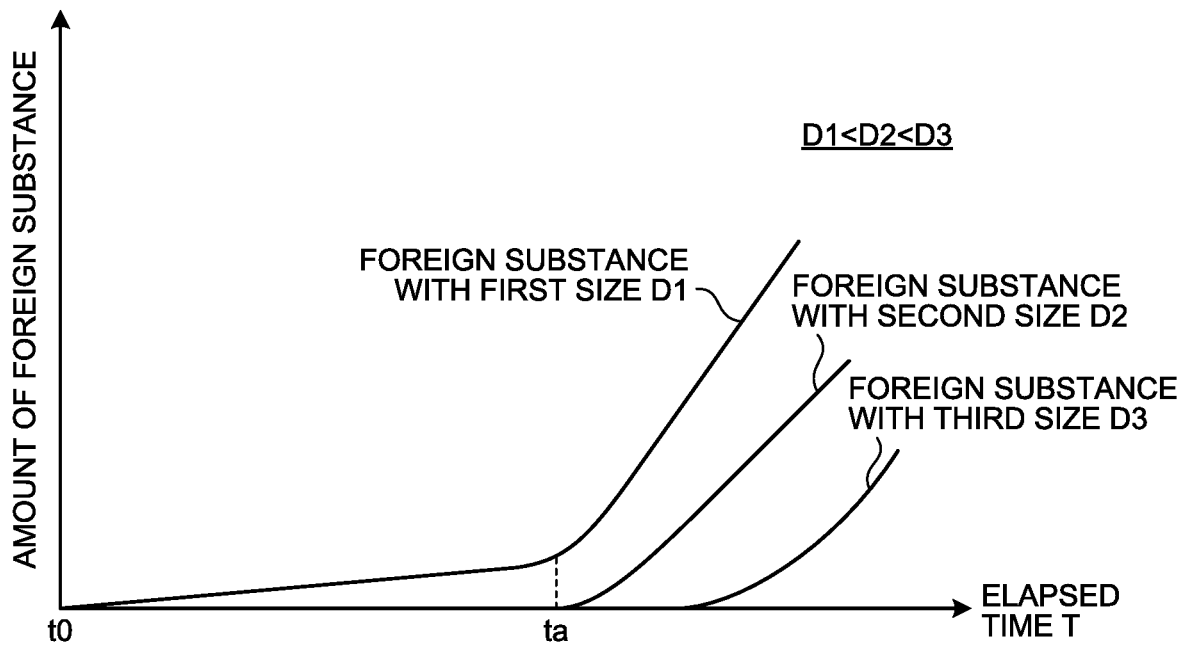
FIG. 10 is a diagram illustrating an example of an image processing result by an image processing unit according to the first embodiment.

FIG. 10 is a diagram illustrating an example of an image processing result by the image processing unit 62 according to the present embodiment. As illustrated in FIG. 10, the image processing unit 62 calculates the relationship between elapsed time T from a start time point t0, which is when the use of a new gear has been started, and the amount of the foreign substance collected on the incident surface 51C. The image capturing device 52 starts acquiring the image data of the internal space 2H from the start time point t0 which is when the use of the new gear has been started.

The progress of wear (including uneven wear) of the machine component of the axle device 1 or the deterioration state of the machine component thereof is estimated from the amount of the foreign substance collected on the incident surface 51C. When the amount of the foreign substance collected on the incident surface 51C is large, it is estimated that large number of foreign substances are generated from the machine component causing the progress of the deterioration of the machine component. On the other hand, when the amount of the foreign substance collected on the incident surface 51C is small, it is estimated that the generation of the foreign substance from the machine component is small and thus, the deterioration of the machine component is not in progress yet.

As described above, in the present embodiment, the size of the foreign substance collected on the incident surface 51C is calculated. The image processing unit 62 calculates the relationship between the elapsed time T from the start time point t0, the size of the foreign substance, and the collected amount that indicates the amount of the foreign substance with the size above collected on the incident surface 51C. In the example illustrated in FIG. 10, there are calculated the relationship between the elapsed time T from the start time point t0 and the amount of a foreign substance with a first size D1, the relationship between the elapsed time T from the start time point t0 and the amount of a foreign substance with a second size D2, and the relationship between the elapsed time from the start time point t0 and the amount of a foreign substance with a third size D3. The first size D1 is smaller than the second size D2 and the third size D3. The second size D2 is smaller than the third size D3. At the start time point t0, the amount of the foreign substance collected on the incident surface 51C is zero.

According to the findings of the present inventors, until the use of a new machine component elapses a certain time point to from the start time point t0, the amount of the foreign substance with the first size D1 collected on the incident surface 51C increases gradually and proportionally. The amount of the foreign substance with the first size D1 collected on the incident surface 51C rapidly increases when the use of a new machine component elapses the certain time point to and accordingly, the machine component reaches its end of life. Also in the case where the foreign substance with the second size D2 or the third size D3 appears and is collected on the incident surface 51C, the machine component reaches its end of life. By the appearance of the foreign substance with the second size D2 or the third size D3, it is estimated that the uneven wear in the machine component occurs, for example.

As described above, the image processing unit 62 can determine whether the machine component of the axle device 1 has reached its end of life based on the amount and size of the foreign substance collected on the incident surface 51C.

In the present embodiment, when it is determined that the machine component of the axle device 1 has reached its end of life, the overhaul of the axle device 1 is performed before the life of the machine component of the axle device 1 exhausts. Based on the collected state of the foreign substance determined from the image data of the image capturing device 52, a manager of the axle device 1 can grasp the end of life of the machine component of the axle device 1 and thus, perform the overhaul at appropriate timing immediately before the life of the machine component exhausts.

The image data, which is acquired in the image capturing device 52 and in which the image processing has been performed by the image processing unit 62, is transmitted to the server 80 via the communication network 90. The server 80 receives the image data supplied from each of the plurality of axle devices 1 that exists across the country. The server 80 analyzes the plurality of image data supplied therefrom. Based on the plurality of collected image data, the server 80 can determine the deterioration state of the machine component in each of the axle devices 1 and thus, determine whether the machine component of the axle device 1 has reached its end of life. The server 80 can report, via the communication network 90, the deterioration state of the axle device 1, or the determination result of whether the machine component of the axle device 1 has reached its end of life. Moreover, the server 80 can cause the display device 81 to display the image data of the internal space 2H of the housing 2, the deterioration state of the machine component, and the determination result of whether the machine component has reached its end of life. In a site office in which the axle device 1 exists, the overhaul of the axle device 1 can be performed at appropriate timing based on the data reported from the server 80.

As described above, according to the present embodiment, by providing the magnet 53, the foreign substance, which is the magnetic body such as the wear powder or the broken pieces from the gear provided in the internal space 2H of the axle housing 2, can be collected by the magnetic force of the magnet 53 even when such foreign substance is generated. The foreign substance is prevented from meshing with the bearing provided in the internal space 2H of the axle housing 2 since the foreign substance is collected. As a result, the life of the bearing can be extended.

Moreover, according to the present embodiment, by providing the image capturing device 52, the foreign substance collected by the magnet 53 is captured by the image capturing device 52 via the transparent spacer member 51. The magnet 53 is disposed in the visual field area of the lens system of the image capturing device 52, and the image capturing device 52 can detect the collected state of the foreign substance collected on the spacer member 51 by the magnetic force of the magnet 53. The collected state of the foreign substance includes the amount and/or the size of the foreign substance collected on the incident surface 51C of the spacer member 51. The progress of wear of the gear or the deterioration state of the gear is estimated by the collected state of the foreign substance. For example, when a large amount of the foreign substance is collected on the incident surface 51C of the spacer member 51, it is estimated that large number of foreign substances are generated from the gear causing the progress of the deterioration of the gear. On the other hand, when a small amount of the foreign substance is collected on the incident surface 51C of the spacer member 51, it is estimated that the generation of the foreign substance from the gear is small and thus, the deterioration of the gear is not in progress yet. When the collected amount of the foreign substance is large, it is determined that the overhaul is necessary, and when the collected amount of the foreign substance is small, it is determined that the overhaul is not necessary yet. As described above, the monitoring of the collected state of the foreign substance by the image capturing device 52 makes it possible to accurately determine the end of life of the gear and thus, to perform the overhaul of the axle device 1 at appropriate timing immediately before the life of the gear exhausts.

Furthermore, in the present embodiment, the image capturing device 52 that acquires the image data of the foreign substance is used as a detecting device that detects the foreign substance. Therefore, based on the image data captured by the image capturing device 52, not only the amount of the foreign substance, but also the size of each foreign substance can be determined. In addition, not only the timing of the overhaul, but also the state (uneven wear state or broken state) of the gear can be estimated.

Moreover, the image capturing device 52 captures the internal space 2H of the axle housing 2 via the transparent spacer member 51. Therefore, not only the foreign substance collected on the spacer member 51, but also the gear disposed in the internal space 2H can be captured directly. As a result, the appearance of the gear can be determined directly based on the image data captured by the image capturing device 52.

Moreover, according to the present embodiment, there is provided the cover member 54 that supports the image capturing device 52 at the outer side of the axle housing 2 and the spacer member 51. Accordingly, the image capturing device 52 can capture the internal space 2H without having a contact with the oil housed in the internal space 2H of the axle housing 2. In addition, the position of the image capturing device 52 is fixed by the cover member 54 and thus, the variation in a relative position between the image capturing device 52 and the spacer member 51 is suppressed.

Moreover, according to the present embodiment, the reflecting mirror 55 supported by the cover member 54 is provided, and the image capturing device 52 captures the internal space 2H via the reflecting mirror 55. The cover member 54 supports both of the image capturing device 52 and the reflecting mirror 55. Therefore, the variation in the relative position between the image capturing device 52 and the reflecting mirror 55 is suppressed. Moreover, the image capturing device 52 captures the internal space 2H via the reflecting mirror 55. Therefore, the cover member 54 can support the image capturing device 52 in any posture. Accordingly, it becomes possible to reduce the size of the axle device 1. For example, the protruding amount of the image capturing device 52 from the axle housing 2 in the front-rear direction is suppressed.

In addition, according to the present embodiment, the plurality of gears are disposed in the internal space 2H, and the oil for lubricating or cooling these gears is housed in the internal space 2H. The opening 20 of the axle housing 2, in which the spacer member 51 is disposed in a state where the gears are not rotated, is provided above the liquid level of the oil. Accordingly, work of draining the oil from the axle housing 2 when removing the spacer member 51 from the opening 20 of the axle housing 2 for cleaning or replacement of the magnet 53 can be omitted. Furthermore, when the gears are rotated, the oil is scraped up by the gears, and comes in contact with the incident surface 51C of the spacer member 51. Thereby, the foreign substance contained in the oil is sufficiently collected on the spacer member 51 by the magnetic force of the magnet 53.

Moreover, according to the present embodiment, the axle device 1 includes the differential 6, the transmission shaft 4, and the axle shaft 5. The differential is disposed in the internal space 2H of the axle housing 2, and is coupled to the drive shaft 3 that rotates by the driving force generated in the engine. The rotating force of the drive shaft 3 is transmitted to the transmission shaft 4 via the differential 6. The rotating force of the transmission shaft 4 is transmitted to the axle shaft 5. The differential 6 includes the bevel gear 11 that rotates about the rotation axis AX of the transmission shaft 4, and the spacer member 51 is disposed so as to face the tooth surface of the bevel gear 11. Accordingly, the oil scraped up by the bevel gear 11 sufficiently comes in contact with the incident surface 51C of the spacer member 51. Therefore, the foreign substance contained in the oil is collected on the spacer member 51 by the magnetic force of the magnet 53. In addition, the image capturing device 52 can directly capture the appearance of the bevel gear 11 via the spacer member 51.

Furthermore, according to the present embodiment, the bevel gear 11 of the differential 6 has the largest diameter among the plurality of gears disposed in the internal space 2H of the axle housing 2. Among the plurality of gears disposed in the internal space 2H of the axle housing 2, the bevel gear 11 has the largest force to scrape up the oil. By disposing the magnet 53, which is supported by the spacer member 51, near the bevel gear 11, the foreign substance contained in the oil can be efficiently collected by the spacer member 51.

Moreover, according to the present embodiment, the illumination device 52S that illuminates the imaging area of the image capturing device 52 is provided. By providing the image capturing device 52 with the illumination device 52S, even when the internal space 2H of the axle housing 2 is dark, the image capturing device 52 can finely capture the internal space 2H of the axle housing 2.

Moreover, according to the present embodiment, the spacer member 51 includes a polycarbonate resin. The polycarbonate resin is transparent, and has heat resistance. Therefore, even when the oil with high temperature in the internal space 2H of the axle housing 2 comes in contact with the spacer member 51, the thermal deformation of the spacer member 51 is suppressed.

In addition, according to the present embodiment, there are provided the image data acquisition unit 61 and the output device 70. The image data acquisition unit 61 acquires the image data captured by the image capturing device 52. The output device 70 outputs the image data acquired by the image data acquisition unit 61. The image data that indicates the collected state of the foreign substance is transmitted from the plurality of axle devices 1 (dump trucks 100) that exist across the country to the server 80. Based on the plurality of collected image data, the server 80 can determine the deterioration state of each of the plurality of axle devices 1. The server 80 can report, to the site office in which the axle device 1 operates, the deterioration state of the axle device 1, or the determination result of whether the component of the axle device 1 has reached its end of life. In the site office, the overhaul of the axle device 1 can be performed at appropriate timing based on the data reported from the server 80.

Figure 11:
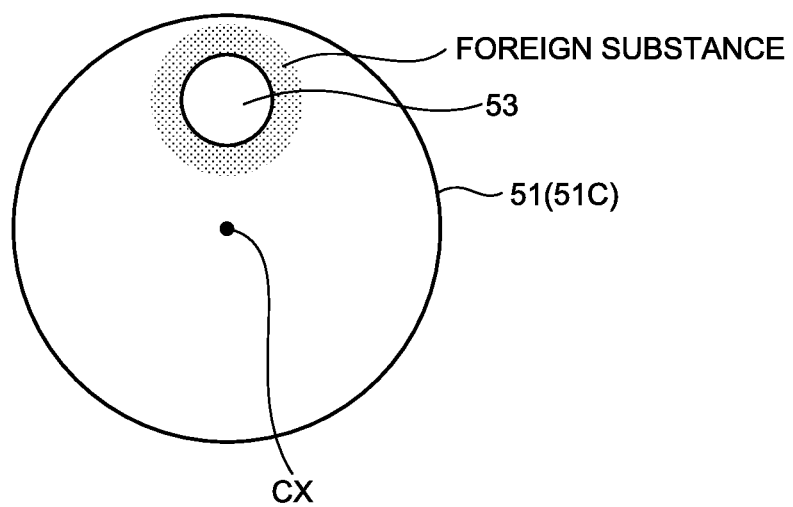
FIG. 11 illustrates an example of the image data captured by the image capturing device according to the first embodiment.

Note that, in the embodiment described above, the magnet 53 has been disposed at the central axis CX of the spacer member 51. However, as illustrated in FIG. 11, the magnet 53 may be disposed at a position away from the central axis CX of the spacer member 51. Accordingly, the image capturing device 52 can smoothly acquire the image data of the bevel gear 11 disposed in the internal space 2H.

Note that, in the embodiment described above, the image processing unit 62 has been provided in the computer system 60 mounted on the axle device 1 (dump truck 100). However, the function of the image processing unit 62 does not necessarily have to be mounted on the axle device 1 (dump truck 100). For example, the server 80 may have the function of the image processing unit 62. In such case, the image data acquired by the image data acquisition unit 61 is transmitted to the server 80 via the output unit 63, the transmitting device 70, and the communication network 90. Then, the image processing by the image processing unit 62 is performed in the server 80.

Note that, in the embodiment described above, some or all of the components of the deterioration state estimation system 200 may be mounted on the dump truck 100.

Second Embodiment

A second embodiment will be described. In the following description, the same components as those of the embodiment described above will be denoted by the same reference numerals, and description thereof will be simplified or omitted.

Figure 12:
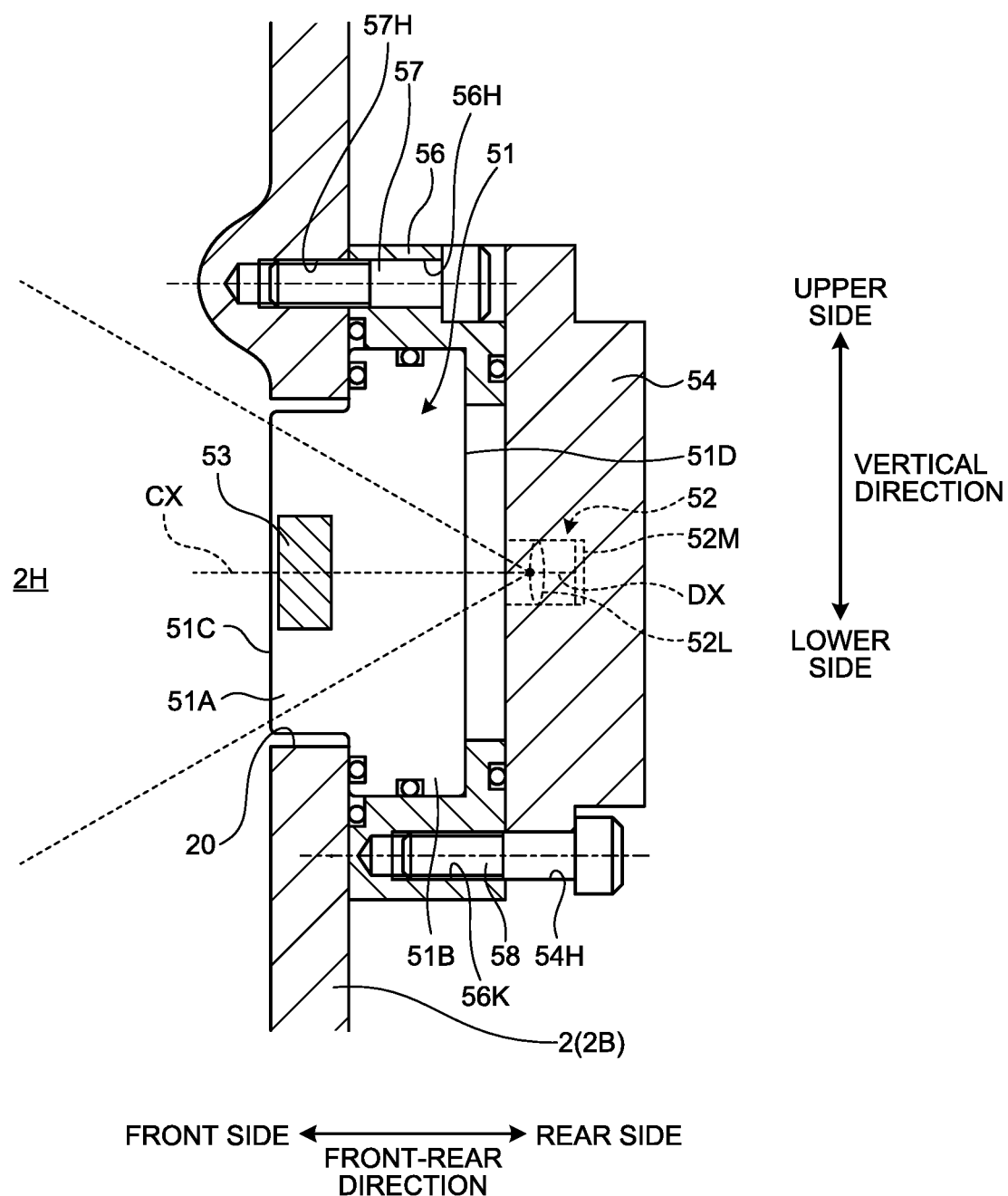
FIG. 12 is a side cross-sectional view illustrating a portion of a mechanical device according to a second embodiment.

FIG. 12 is a side cross-sectional view illustrating a portion of an axle device 1 according to the present embodiment. Similar to the embodiment described above, the axle device 1 includes an axle housing 2, a transparent spacer member 51, a magnet 53, an image capturing device 52, and a cover member 54. The spacer member 51 is disposed in an opening 20 of an axle housing 2. The magnet 53 is supported by the spacer member 51. The image capturing device 52 captures an internal space 2H of the axle housing 2 via the spacer member 51. The cover member supports the image capturing device 52 at an outer side of the axle housing 2 and the spacer member 51.

In the present embodiment, a reflecting mirror does not exist. In the present embodiment, the cover member 54 supports the image capturing device 52 so that an optical axis DX of a lens system of the image capturing device 52 extends in a front-rear direction. In the present embodiment, a central axis CX and the optical axis DX are substantially the same.

Furthermore, in the present embodiment, a lens system 52L and an imaging element (a CCD image sensor or a CMOS image sensor) 52M of the image capturing device 52 are disposed inside the cover member 54. In the present embodiment, the cover member 54 that supports the image capturing device 52 including the lens system 52L and the imaging element 52M is, for example, a camera-equipped cellular phone.

Also in the present embodiment, the image capturing device 52 can capture a foreign substance collected by the magnet 53 via the transparent spacer member 51.

Third Embodiment

A third embodiment will be described. In the following description, the same components as those of the embodiments described above will be denoted by the same reference numerals, and description thereof will be simplified or omitted.

Figure 13:
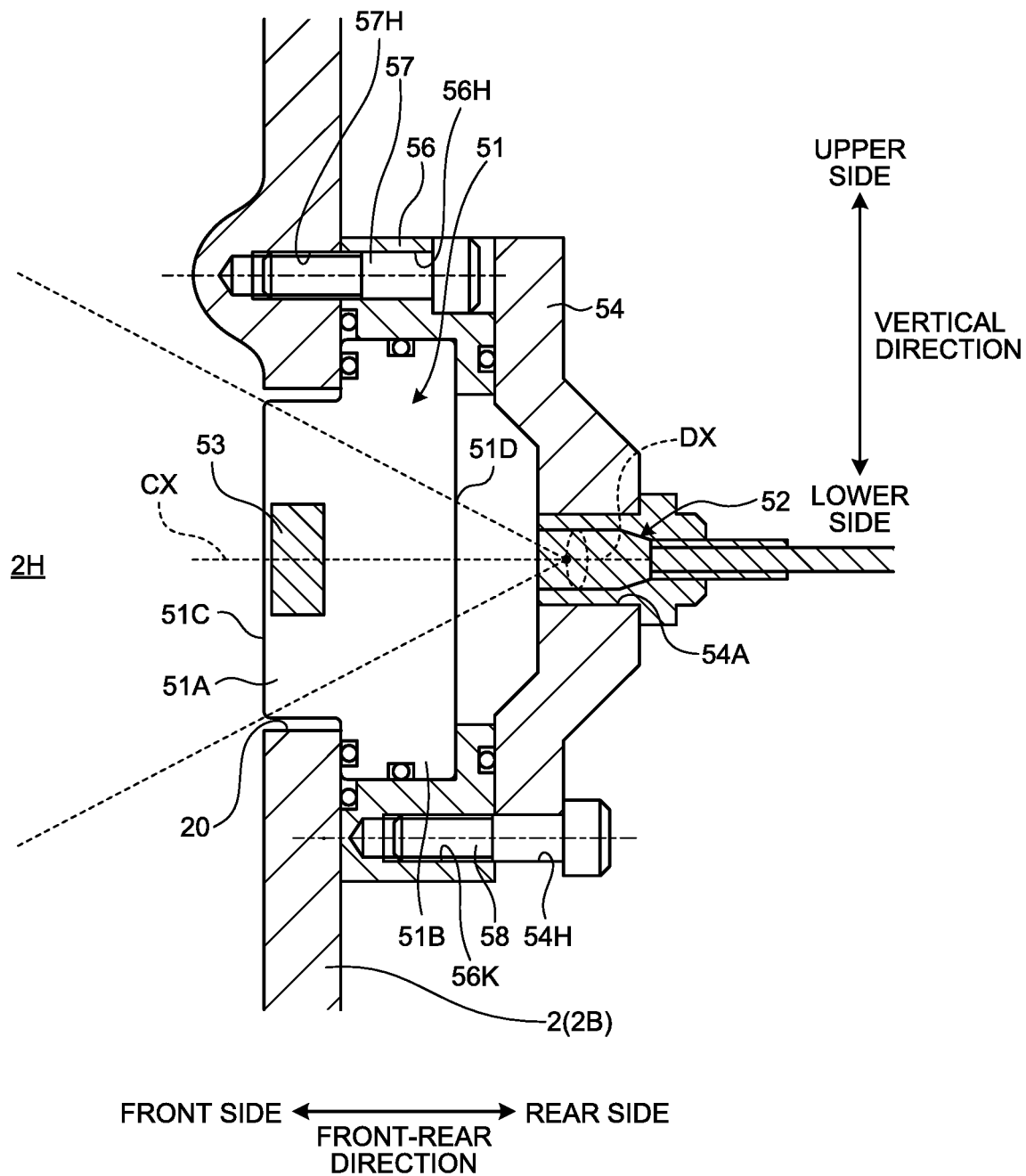
FIG. 13 is a side cross-sectional view illustrating a portion of a mechanical device according to a third embodiment.

FIG. 13 is a side cross-sectional view illustrating a portion of an axle device 1 according to the present embodiment. Similar to the embodiments described above, the axle device 1 includes an axle housing 2, a transparent spacer member 51, a magnet 53, an image capturing device 52, and a cover member 54. The spacer member 51 is disposed in an opening 20 of an axle housing 2. The magnet 53 is supported by the spacer member 51. The image capturing device 52 captures an internal space 2H of the axle housing 2 via the spacer member 51. The cover member supports the image capturing device 52 at an outer side of the axle housing 2 and the spacer member 51.

In the present embodiment, a reflecting mirror does not exist. The cover member 54 has a hole 54A in which the image capturing device 52 is disposed. The image capturing device 52 is supported by an inner surface of the hole 54A. A portion of the image capturing device 52 is disposed in the hole 54A of the cover member 54, and a portion of the image capturing device 52 is disposed outside the cover member 54. A portion of the image capturing device 52 protrudes behind a rear surface of the cover member 54.

The cover member 54 supports the image capturing device 52 so that an optical axis DX of a lens system of the image capturing device 52 extends in a front-rear direction. A central axis CX and the optical axis DX are substantially the same.

Also in the present embodiment, the image capturing device 52 can capture a foreign substance collected by the magnet 53 via the transparent spacer member 51.

Fourth Embodiment

A fourth embodiment will be described. In the following description, the same components as those of the embodiments described above will be denoted by the same reference numerals, and description thereof will be simplified or omitted.

Figure 14:
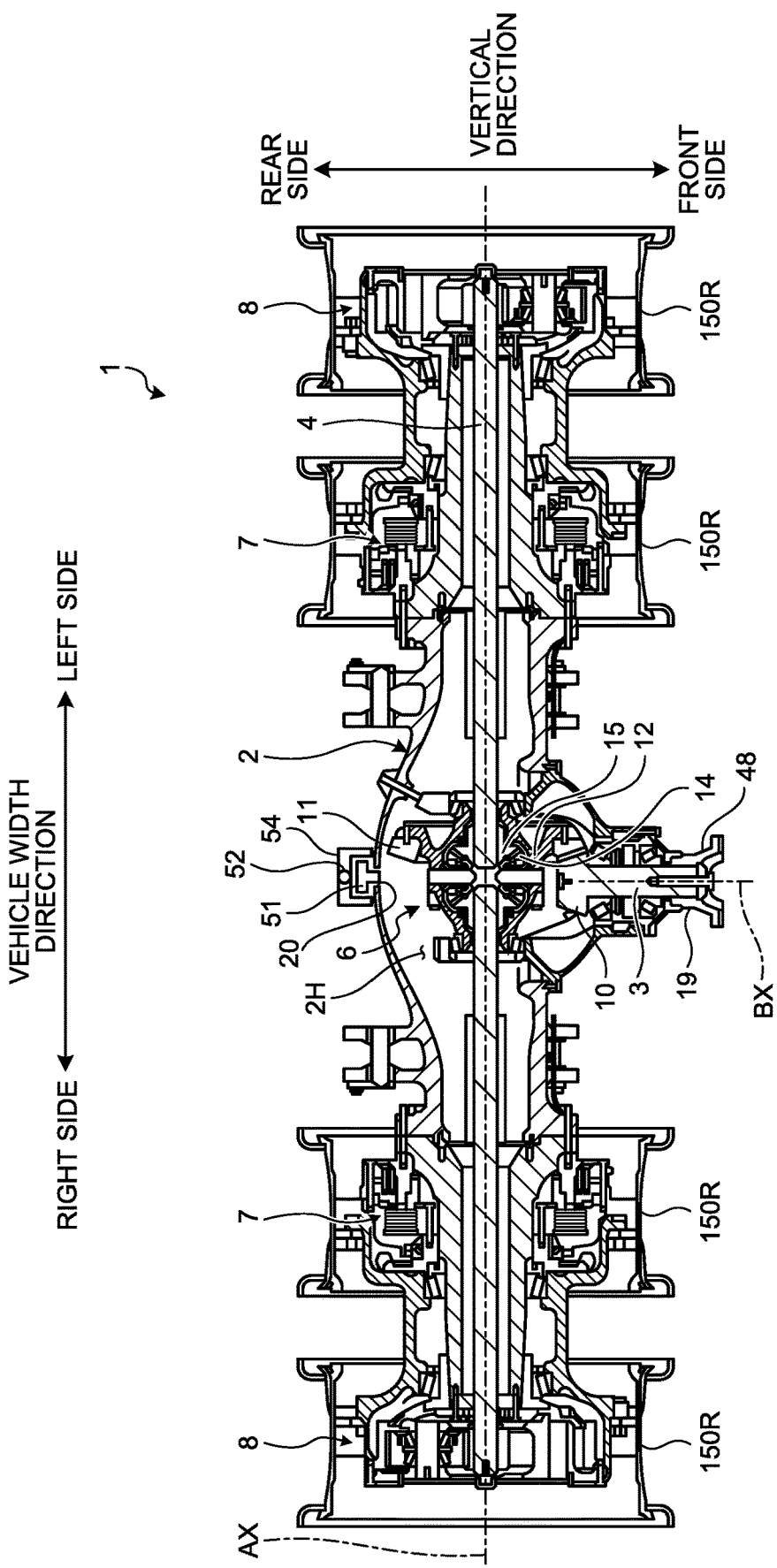
FIG. 14 is a cross-sectional view illustrating an example of a mechanical device according to a fourth embodiment.

FIG. 14 is a cross-sectional view illustrating an example of the axle device 1 according to the present embodiment. The axle device 1 described in the embodiments above has had the axle shaft 5 to which the rotating force of the transmission shaft 4 is transmitted. However, in the present embodiment, an axle device 1 that does not have an axle shaft will be described.

As illustrated in FIG. 14, the axle device 1 has an axle housing 2, a differential 6, a wet multi-plate brake device 7, a planetary gear type speed reducer 8, and a transmission shaft 4. The differential 6 is disposed in an internal space 2H of an axle housing 2, and is coupled to a drive shaft 3. The wet multi-plate brake device 7 and the planetary gear type speed reducer 8 are disposed in an internal space of a rear wheel 150R. Rotating force of the drive shaft 3 is transmitted to the transmission shaft 4 via the differential 6. The rear wheel 150R of a dump truck 100 is driven by the rotation of the transmission shaft 4.

The drive shaft 3 is rotatably supported by a pinion gauge 19, and rotates by driving force generated by an engine. The drive shaft 3 extends in a front-rear direction, and rotates about a rotation axis BX. The rotation axis BX extends in the front-rear direction.

A coupling 48 is fixed to an end portion of the drive shaft 3. The drive shaft 3 is coupled to a propeller shaft (not illustrated) via the coupling 48. The driving force generated by the engine is transmitted to the propeller shaft via a transmission device. The propeller shaft rotates about the rotation axis BX based on the driving force generated by the engine. The drive shaft 3 coupled to the propeller shaft via the coupling 48 rotates about the rotation axis BX by the rotation of the propeller shaft about the rotation axis BX.

The drive shaft 3 has a drive pinion gear 10. The differential 6 has a bevel gear 11 that meshes with the drive pinion gear 10, and a differential case 12 coupled to the bevel gear 11.

When the drive shaft 3 rotates about the rotation axis BX, the bevel gear 11 rotates about a rotation axis AX. The rotation axis AX extends in a vehicle width direction. The rotation axis AX and the rotation axis BX are substantially orthogonal to each other.

When the bevel gear 11 rotates about the rotation axis AX, the differential case 12 rotates about the rotation axis AX together with the bevel gear 11. A pair of pinion gears 14 and a pair of side gears 15 are provided in the differential case 12. The pinion gears 14 are rotatably supported by the differential case 12 via a spider 13. The side gears 15 mesh with the pinion gears 14.

The side gear 15 is fixed to the transmission shaft 4. The transmission shafts 4 are provided on the right side and the left side. The side gear 15 is splined to the transmission shaft 4. The side gear 15 and the transmission shaft 4 rotate about the rotation axis AX.

The planetary gear type speed reducer 8 is provided at an outer side of the wet multi-plate brake device 7 in the vehicle width direction. The rotating speed of the transmission shaft 4 is reduced by the planetary gear type speed reducer 8. The rear wheel 150R rotates about the rotation axis AX by the rotation of the transmission shaft 4 about the rotation axis AX.

Also in the present embodiment, the spacer member 51 faces a tooth surface of the bevel gear 11. Accordingly, oil scraped up by the bevel gear 11 sufficiently comes in contact with an incident surface 51C of the spacer member 51. Therefore, a foreign substance contained in the oil is collected on the spacer member 51 by magnetic force of the magnet 53. In addition, the image capturing device 52 can directly capture the appearance of the bevel gear 11 via the spacer member 51.

Fifth Embodiment

A fifth embodiment will be described. In the following description, the same components as those of the embodiments described above will be denoted by the same reference numerals, and description thereof will be simplified or omitted.

Figure 15:
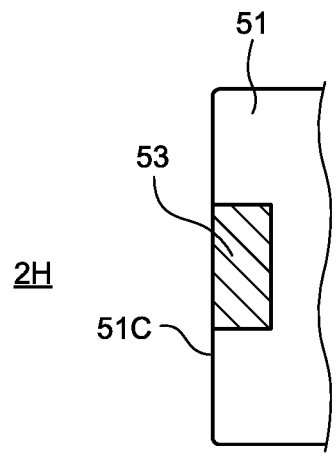
FIG. 15 is a side cross-sectional view illustrating a portion of a mechanical device according to a fifth embodiment.

In the embodiments described above, the magnet 53 has been buried in the spacer member 51, and the magnet 53 has not come into contact with the oil in the internal space 2H. However, as illustrated in FIG. 15, a recessed portion is provided on an incident surface 51C of a spacer member 51, and a magnet 53 may be disposed in the recessed portion. In such case, a surface of the magnet 53 faces an internal space 2H and comes into contact with oil in the internal space 2H.

Sixth Embodiment

A sixth embodiment will be described. In the following description, the same components as those of the embodiments described above will be denoted by the same reference numerals, and description thereof will be simplified or omitted.

Figure 16:
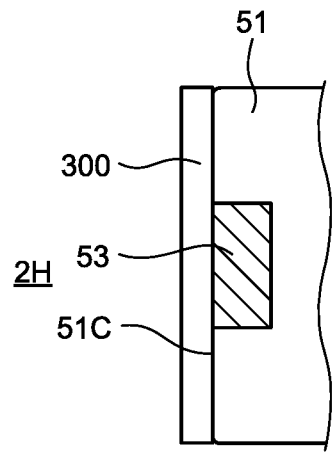
FIG. 16 is a side cross-sectional view illustrating a portion of a mechanical device according to a sixth embodiment.

In the sixth embodiment described above, the magnet 53 has been disposed in the recessed portion of the incident surface 510 of the spacer member 51, and the magnet 53 and the oil in the internal space 2H have come into contact with each other. However, as illustrated in FIG. 16, a transparent plate member 300 may be provided on an incident surface 51C. The plate member 300 is disposed so as to cover a surface of a magnet 53, and causes to suppress the contact between the magnet 53 and oil in an internal space 2H.

Note that, in the embodiments described above, the axle device 1 has been described as an example of a mechanical device that includes the machine component immersed in oil in the internal space of the housing. However, the mechanical device may be a transmission device. The transmission device is also a mechanical device that includes the machine component immersed in oil in the internal space of the housing. According to the embodiments described above, a deterioration state of the machine component of the transmission device can also be estimated.

REFERENCE SIGNS LIST

1 Axle device
2 Axle housing
2B Differential body
2L Left axle housing
2R Right axle housing
2H Internal space
3 Drive shaft
4 Transmission shaft
5 Axle shaft
6 Differential
7 wet multi-plate brake device
8 Planetary gear type speed reducer
10 Drive pinion gear
11 Bevel gear
12 Differential case
13 Spider
14 Pinion gear
15 Side gear
19 Pinion gauge
20 Opening
42 Drive shaft opening portion
43L Axle shaft opening portion
43R Axle shaft opening portion
48 Coupling
51 Spacer member
51A Projected portion
51B Flange portion
51C incident surface
51D exit surface
52 Image capturing device
52S Illumination device
53 Magnet
54 Cover member
54H Hole
55 Reflecting mirror
56 Fixing member
56H Hole
56K Hole
57 Bolt
57H Hole
58 Bolt
60 Computer system
61 Image data acquisition unit
62 Image processing unit
63 Output unit
70 Transmitting device
80 Server
81 Display device
82 Display control unit
100 Dump truck (working vehicle)
110 Vehicle body frame
120 Dump body
130 Traveling device
140 Tire
150 Wheel
150F Front wheel
150R Rear wheel
160 Suspension device
200 Deterioration state estimation system
AX Rotation axis
BX Rotation axis
CX Central axis
DX Optical axis

The invention claimed is:

1. A mechanical device comprising:
a housing that has an internal space in which a machine component immersed in oil is housed;
a transparent spacer member disposed in an opening of the housing;
a magnet supported in the spacer member so the magnet can attract a foreign substance to an incident surface of the transparent spacer member; and
an image capturing device that captures the internal space of the housing via the spacer member,
wherein the magnet is disposed in a visual field area of a lens system of the image capturing device and the image capturing device can capture the foreign substance attracted onto the incident surface of the transparent spacer member.

2. The mechanical device according to claim 1, comprising a cover member that supports the image capturing device at an outer side of the housing and the spacer member.

3. The mechanical device according to claim 2, comprising a reflecting mirror supported by the cover member, wherein
the image capturing device captures the internal space via the reflecting mirror.

4. The mechanical device according to claim 1, comprising a gear disposed in the internal space, wherein
oil for lubricating or cooling the gear is housed in the internal space, and
in a state where the gear is not operated, the opening is provided above a liquid level of the oil.

5. The mechanical device according to claim 1, wherein the machine component is a machine component of an axle device, and
the housing is an axle housing.

6. The mechanical device according to claim 1, comprising:
a differential disposed in the internal space, and coupled to a drive shaft rotated by driving force generated by an engine; and
a transmission shaft to which rotating force of the drive shaft is transmitted via the differential, wherein
the differential includes a bevel gear that rotates about a rotation axis of the transmission shaft, and
the spacer member faces a tooth surface of the bevel gear.

7. The mechanical device according to claim 5, comprising an axle shaft to which rotating force of the transmission shaft is transmitted.

8. The mechanical device according to claim 1, comprising:
an image data acquisition unit that acquires image data captured by the image capturing device; and
an output device that outputs the image data acquired by the image data acquisition unit.

9. The mechanical device according to claim 8, wherein the output device includes a transmitting device that transmits the image data to a server.

10. A working vehicle comprising the mechanical device according to claim 1.

11. A deterioration state estimation system of a machine component, comprising:
a housing that has an internal space in which a machine component immersed in oil is housed;
a transparent spacer member disposed in an opening of the housing;
a magnet supported in the spacer member so the magnet can attract a foreign substance to an incident surface of the transparent spacer member;
an image capturing device that captures the internal space of the housing via the spacer member;
an image data acquisition unit that acquires image data captured by the image capturing device; and
an output device that outputs the image data acquired by the image data acquisition unit,
wherein the magnet is disposed in a visual field area of a lens system of the image capturing device and the image capturing device can capture the foreign substance attracted onto the incident surface of the transparent spacer member.

12. The deterioration state estimation system of a machine component according to claim 11, comprising a server to which the image data is output from the output device.

13. The deterioration state estimation system of a machine component according to claim 11, comprising a display control unit that causes the image data output from the output device to be displayed on a display device.

14. A working vehicle comprising the deterioration state estimation system according to claim 11.

15. A deterioration state estimation method of a machine component, comprising:
capturing an image of an internal space of a housing, in which a machine component immersed in oil is housed, by an image capturing device via a transparent spacer member that includes a magnet supported therein so the magnet can attract a foreign substance to an incident surface of the transparent spacer member and that is disposed in an opening of the housing; and
estimating a deterioration state of the machine component based on the image data captured by the image capturing device,
wherein the magnet is disposed in a visual field area of a lens system of the image capturing device and the image capturing device can capture the foreign substance attracted onto the incident surface of the transparent spacer member.

16. A mechanical device comprising:
a housing that has an internal space in which a machine component immersed in oil is housed;
a transparent spacer member disposed in an opening of the housing and including an incident surface and an exit surface which faces a direction opposite to the incident surface;
a magnet supported by the spacer member so the magnet can attract a foreign substance to an incident surface of the transparent spacer member; and
an image capturing device that captures the internal space of the housing via the spacer member,
wherein the magnet is disposed in a visual field area of a lens system of the image capturing device and the image capturing device can capture the foreign substance attracted onto the incident surface of the transparent spacer member, and
wherein a distance between the magnet and the incident surface is shorter than that between the magnet and the exit surface.

17. The mechanical device of claim 1 wherein, the magnet is buried in the transparent spacer member.

* * * * *